(12) United States Patent
Venier

(10) Patent No.: US 7,819,564 B2
(45) Date of Patent: Oct. 26, 2010

(54) BICYCLE LIGHTING SYSTEM

(75) Inventor: Fabio Venier, Holland Landing (CA)

(73) Assignee: Magna Marque International Inc., Aurora, Ontario (CA)

( * ) Notice: Subject to any disclaimer, the term of this patent is extended or adjusted under 35 U.S.C. 154(b) by 62 days.

(21) Appl. No.: 11/632,752

(22) PCT Filed: Jul. 20, 2005

(86) PCT No.: PCT/IB2005/003573

§ 371 (c)(1),
(2), (4) Date: Jan. 18, 2007

(87) PCT Pub. No.: WO2006/024963

PCT Pub. Date: Mar. 9, 2006

(65) Prior Publication Data

US 2008/0031002 A1    Feb. 7, 2008

(51) Int. Cl.
*B62J 6/00* (2006.01)
*F21V 33/00* (2006.01)

(52) U.S. Cl. ...................................... 362/473; 362/555

(58) Field of Classification Search ......... 362/473–474, 362/554–556
See application file for complete search history.

(56) References Cited

U.S. PATENT DOCUMENTS

| | | | |
|---|---|---|---|
| 4,860,177 A | 8/1989 | Simms | |
| 5,015,918 A | 5/1991 | Copeland | |
| 5,029,055 A | 7/1991 | Lindh | |
| 5,255,171 A * | 10/1993 | Clark | 362/231 |
| 5,446,628 A | 8/1995 | Blom et al. | |
| 5,457,612 A | 10/1995 | Carter | |
| 6,152,588 A * | 11/2000 | Scifres | 362/496 |
| 6,336,736 B1 | 1/2002 | Edmond | |

FOREIGN PATENT DOCUMENTS

| GB | 2071301 A * | 9/1981 |
|---|---|---|
| GB | 2240387 | 7/1991 |

OTHER PUBLICATIONS

International Search Report & Written Opinion for PCT/IB2005/003573 Dated May 8, 2006.

\* cited by examiner

*Primary Examiner*—Jason Moon Han
(74) *Attorney, Agent, or Firm*—Clark Hill P.L.C.

(57) ABSTRACT

A bicycle lighting system for transmitting light from a fixed position on a bicycle to a separate remote reflector positioned on the bicycle. The bicycle lighting system comprises a lighting assembly adapted to be fixedly secured to the bicycle frame, an electrical energy source electrically coupled to the lighting assembly for providing power to selectively illuminate the lighting assembly; a light conduit extending longitudinally between a first end coupled to the lighting assembly and a second opposite end adjacent the reflector for transferring light emitted from the lighting assembly to the remote reflector, and a light transmitting lens coupled to the second end of said light conduit for transmitting light to the remote reflector mounted to the bicycle.

5 Claims, 4 Drawing Sheets

BICYCLE LIGHTING SYSTEM

BACKGROUND OF THE INVENTION

1. Field of the Invention

The subject invention relates to a bicycle lighting system and a method of routing output from a light emitting diode or similar light source from a fixed position on a bicycle frame to a remote accessory part, such as a rear fender, that is also attached to the bicycle frame.

2. Brief Description of the Related Art

Light emitting diodes (LEDs) have recently been developed for use as a light source in vehicle lamps. An advantage to using LEDs is that they typically have an operating life of as much as 100,000 hours before they begin to degrade. LEDs also draw less current from the vehicle's electrical system and emit more light than similarly configured or styled filament light bulbs.

Numerous bicycle rear lighting systems have been proposed that employ LEDs. U.S. Pat. No. 4,860,177 teaches a bicycle safety light which is mounted to the seat column of a bicycle and which includes a plurality of light emitting diodes that are arranged in three horizontal rows and in ten vertical columns. The control circuitry sequentially activates each light emitting diode in an array to produce a moving light pattern to improve visibility.

U.S. Pat. No. 5,015,918 teaches the provision of red LEDs having sufficient brightness and efficiency to be employed as a bicycle tail lamp. The tail lamp is a steady flashing lamp and circuitry is provided for causing the LED of the lamp to flash.

U.S. Pat. No. 5,029,055 discloses a lamp including a reflector, batteries and a light emitting diode. The LED is hermetically encased between a glass that also serves as a reflector, and a rear wall of the lamp. The light emitting diode is preferably a super ultrabright or high superbright LED.

U.S. Pat. No. 5,457,612 discloses a bicycle rear lighting system employing at least two separate LED arrays, one extending generally horizontally and one extending generally vertically, to generate a cross of light that improves visibility. The LED arrays are removable via VELCRO fasteners, presumably to avoid theft.

Current systems utilizing LEDs suffer from the disadvantage of either being susceptible to theft, or requiring the bicycle rider to remove and carry the LED system with him. Neither option is ideal.

In view of the above disadvantage, one object of the invention is to provide a lighting system that is permanently fixed to the bicycle frame, and therefore resistant to theft, while still ensuring that the light radiation is unobstructed. Obstruction of the light can easily occur by mounting of accessory pieces such as rear fenders that normally block the light.

Another object is to provide a lighting assembly utilizing an array of light emitting diodes such that the light emanating from each diode will overlap and reinforce the light beam emitted from an adjacent LED.

SUMMARY OF THE INVENTION

According to the present invention there is provided a bicycle lighting system for transmitting light from a fixed position on a bicycle to a separate remote reflector positioned on the bicycle. The bicycle lighting system comprises a lighting assembly adapted to be fixedly secured to the bicycle frame, an electrical energy source electrically coupled to the lighting assembly for providing power to selectively illuminate the lighting assembly; a light conduit extending longitudinally between a first end coupled to the lighting assembly and a second opposite end adjacent the reflector for transferring light emitted from the lighting assembly to the remote reflector, and a light transmitting lens coupled to the second end of said light conduit for transmitting light to the remote reflector mounted to the bicycle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
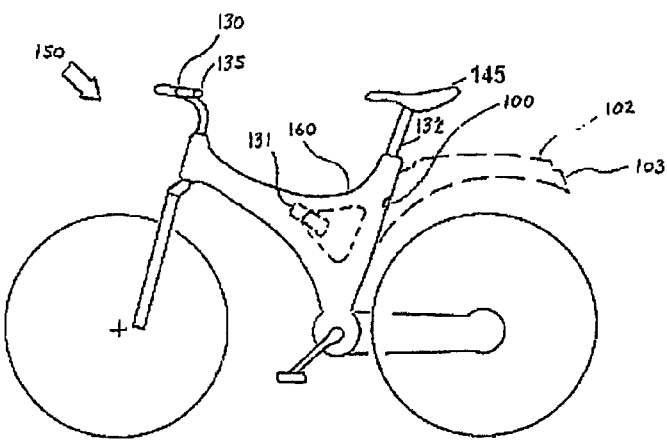
FIG. 1 is a side view of a bicycle, which illustrates the preferred embodiment of the invention.

As shown in the drawings for purposes of illustration, the present invention relates to a bicycle lighting system and a method of using a tail light assembly to provide light from a fixed location on a bicycle frame to a distal accessory part when the accessory part blocks or otherwise obscures the fixed light source that is permanently installed on the bicycle frame. The method of transmitting light from the light emitting device to the distal end of the accessory part is relatively simple and does not require the removal of the tail light or the provision of a new light system having a second LED array or alternate light source, wires, and batteries, as is conventional practice.

Referring now to FIG. 1, a bicycle 150 is illustrated having a frame 160, generally constructed of hollow tubing, and the usual components such as handlebars 135, seat 145, wheels, pedals, etc. In this design, the lighting system comprises a fixed tail lighting assembly 100 permanently mounted to the rear of the frame 160, above the rear wheel and below the seat 145. The lighting assembly 100 is electrically connected to at least one battery 131, which may be located inside the hollow tubing of the bicycle frame 160, or in a more convenient location such as the hollow seat tube 132 which supports the seat 145 or the handlebars 135. The lighting system further includes at least one switch 130 electrically connected to the battery 131 and mounted on the handlebars 135 for rider convenience. In this configuration, the permanent tail light 100 only provides illumination to the rear of the bicycle in the absence of an accessory fender 102, shown in dashed lines.

Figure 2:
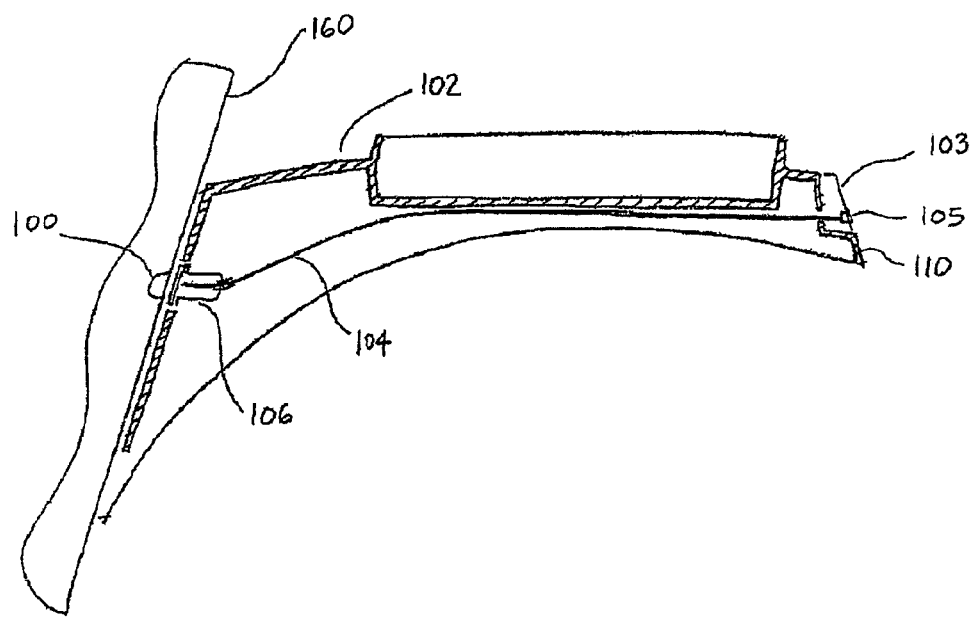
FIG. 2 is a cross-sectional view of the rear of the bicycle, illustrating the fixed position of the tail light and rear fender that is optionally mounted onto the bicycle frame.

As more clearly shown in FIG. 2, the presence of a rear fender or other accessory part 102 that is subsequently added onto the bicycle frame 160 obstructs the light beams emitted from the permanently fixed tail light 100. To overcome this problem, the accessory part 102 has a reflector lens 103 that is in communication with the light assembly 100, as described herein.

Figure 3:
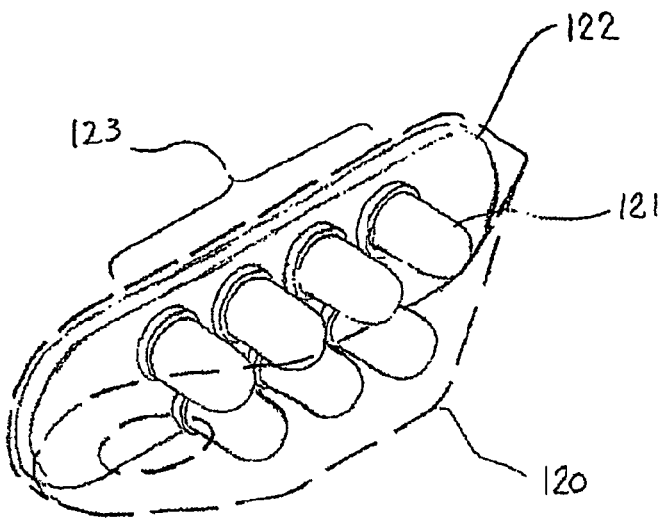
FIG. 3 is an isometric view of the light emitting diode elements arranged in an array and mounted to a printed circuit board.

As shown in FIG. 3, the tail light assembly 100 typically includes multiple light-emitting diodes (LEDs) 121, arranged in an LED array 123, and connected to a printed circuit board 122. The LEDs 121 and printed circuit board 122 are surrounded by a protective lens 120. The LEDs 121 may, for example, have a luminous intensity, measured in candelas (cd), of approximately 3000 mcd and operate at 3 volts. Generally, once the LEDs 121 are positioned, they are permanently fixed and not easily replaceable because they are soldered into the printed circuit board 122. The tail light assembly 100 is securely affixed to the bicycle frame 160 by any known fastening means, and is a permanent fixture that is incorporated into the styling of the bicycle.

Figure 4:
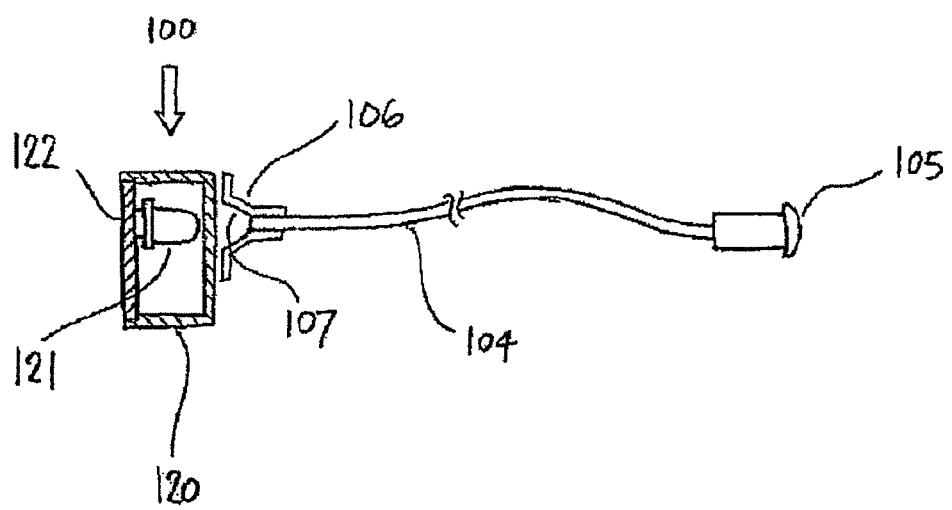
FIG. 4 is a cross-sectional view of the tail light assembly, light conduit and transmitting lens.
Figure 5:
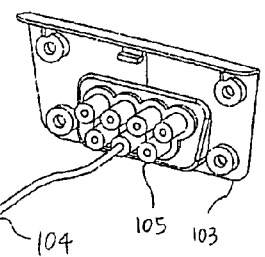
FIG. 5 is an isometric view of the light receiver, light conduit and transmitting lenses, illustrating the internal connection from the light source to the rear reflector.

As shown in FIG. 4, the light emanating from each LED 121 enters a corresponding light receiver 106 (only one shown) with the aid of a reflective funnel 107, and travels through a fiber optic cable or other light conduit 104 to a transmitting lens 105. As shown in FIG. 5, a separate light conduit 104 is required for each LED 121 to transmit light to each transmitting lens 105, such that an array of transmitting lenses 105 is attached to the reflector 103 which is mounted to the rearmost facing surface of the accessory part 102. The light receiver 106, the reflective funnel 107 and the light conduits 104 are embedded inside the accessory part or can be mounted underneath by various known means, such as a clamp, adhesive, or VELCRO type hook and loop fastening system.

In this manner, light is transferred from a fixed, frame-mounted tail light source 100 to a remote visible lens, without the need for a second set of LEDs or other light emitting source.

Figure 6A:
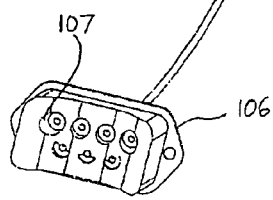
FIG. 6a is an isometric view of the rear reflector as viewed from the rear of the bicycle.
Figure 6A:
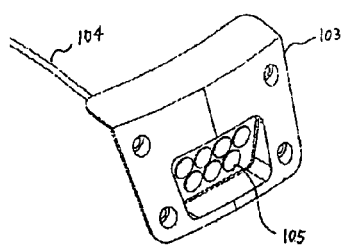
Figure 6B:
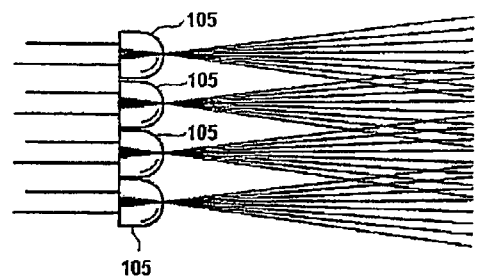
FIG. 6b is a side plane view of an array of four transmitting lenses showing the light beams overlapping each other.

A further refinement of the present invention involves positioning the array of transmitting lenses 105 such that each individual lens 105 is positioned as shown in FIG. 6b. The light beam, which is emitted by each transmitting lens 105, and which diverges slightly, will overlap with the light beam from the adjacent lens 105, to provide a reinforced and uniform light beam that can be seen more readily at a far distance.

Figure 7:
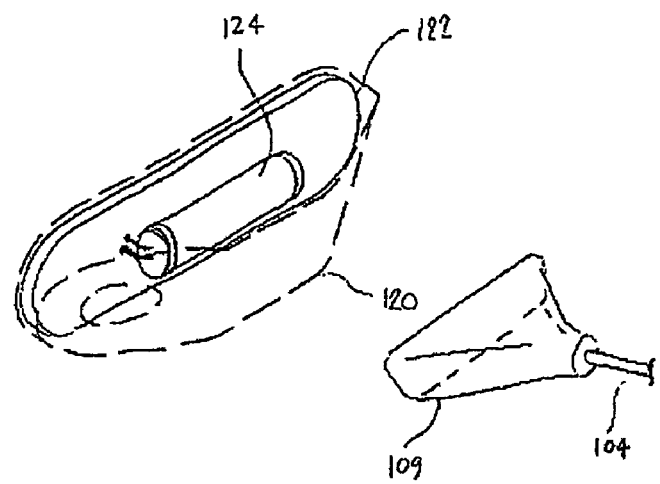
FIG. 7 is an isometric view of an alternative embodiment of the invention, similar to FIG. 3 except for the type of light source.
Figure 8:
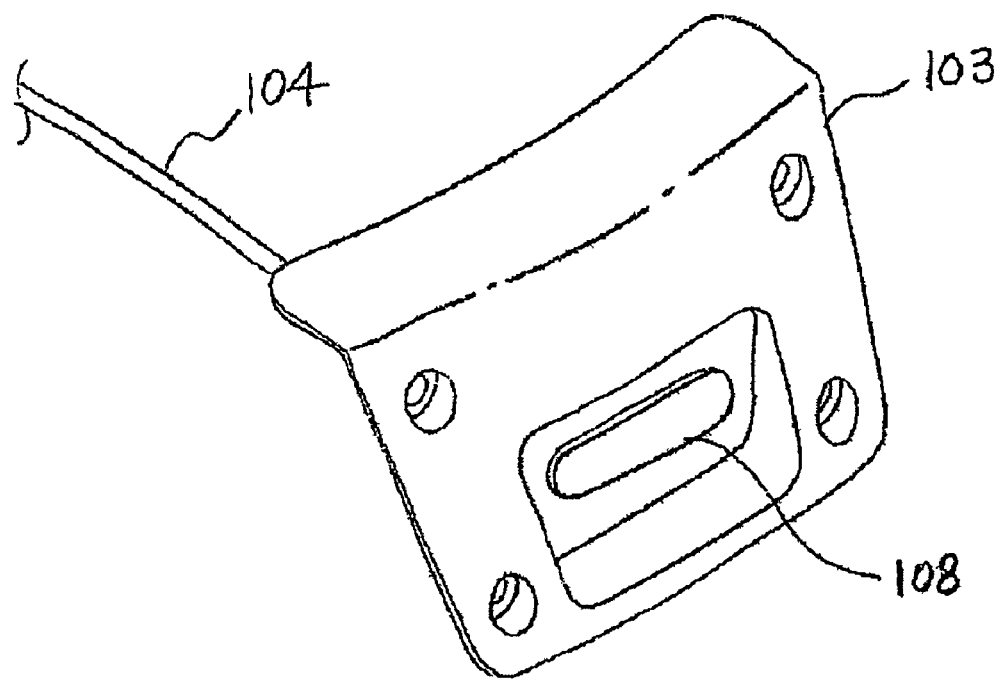
FIG. 8 is an isometric view of the rear reflector as viewed from the rear of the bicycle according to the alternative embodiment.

A second, or alternative, embodiment of the tail light assembly 100 is illustrated in FIGS. 7 and 8, and utilizes a single light emitting source 124 instead of an array of LEDs. For example, a halogen light could be used as the light source. As discussed above, the light source 124 is connected to a printed circuit board 122 and surrounded by a protective lens 120, with the entire assembly permanently fixed to the bicycle frame 160. An appropriately sized funnel 109 is used to gather the light beams for efficient transfer via an optical cable 104 to a singular transmitting lens 108 located in the rear reflector lens 103.

This second embodiment is advantageous in that only a singular light funnel, optical cable and transmitting lens is required.

While the form of apparatus described herein constitutes a preferred embodiment of this invention, it is to be understood that the invention is not limited to this precise form of apparatus. For example, while LED elements are preferred, the term light emitting devices may connote other illuminating devices now known, such as incandescent or energized gas "bulbs".

What is claimed is:

1. A bicycle lighting system for transmitting light from a fixed position on a bicycle to a separate remote reflector positioned on the bicycle, said bicycle lighting system comprising:
   a lighting assembly adapted to be fixedly secured to the bicycle frame;
   an electrical energy source electrically coupled to said lighting assembly for providing power to selectively illuminate said lighting assembly;
   a light conduit extending longitudinally between a first end coupled to said lighting assembly and a second opposite end adjacent the reflector for transferring light emitted from said lighting assembly to the remote reflector;
   a light receiver coupled between said lighting assembly and said first end of said light conduit for collecting light emitted from said lighting assembly, said light receiver having an internal reflective funnel for collecting and channeling light emitted from said lighting assembly into said light conduit; and
   a light transmitting lens coupled to said second end of said light conduit for transmitting light to the remote reflector mounted to the bicycle; wherein
   said lighting assembly includes a first array of at least three light emitting diodes for emitting light along said light conduit to a second array of at least three corresponding light transmitting lenses arranged closely adjacent to each other so that simultaneous diverging light beams from each of said at least three light transmitting lenses overlap light beams from each adjacent light transmitting lens, particularly a light beam from each light transmitting lens having a light transmitting lens on either side thereof, thereby to provide a continuous, uniform, reinforced light beam along said second array.

2. The bicycle lighting system as set forth in claim 1 wherein said lighting assembly includes a printed circuit board electrically coupled between said energy source and each of said light emitting diodes.

3. The bicycle lighting system as set forth in claim 2 wherein said lighting assembly includes a protective lens surrounding each of said light emitting diode and said printed circuit board for sealing said lighting assembly.

4. The bicycle lighting system as set forth in claim 3 further including a switch coupled to said energy supply source and to said lighting assembly for selectively controlling power to illuminate said lighting assembly.

5. A bicycle lighting system for transmitting light from a fixed position on a bicycle to a separate remote reflector positioned on the bicycle, said bicycle lighting system comprising:
   a lighting assembly adapted to be fixedly secured to the bicycle frame;
   an electrical energy source electrically coupled to said lighting assembly for providing power to selectively illuminate said lighting assembly;
   a light conduit extending longitudinally between a first end coupled to said light assembly and a second opposite end adjacent the reflector for transferring light emitted from said lighting assembly to the remote reflector;
   a light receiver coupled to said first end of said light conduit for collecting light emitted from said lighting assembly into said light conduit; and
   a light transmitting lens coupled to said second end of said light conduit for transmitting light to the remote reflector mounted to the bicycle; wherein said light assembly includes a first array of at least three light emitting diodes for emitting light along said light conduit to a second array of at least three corresponding light transmitting lenses arranged closely adjacent to each other so that simultaneous diverging light beams from each of said at least three light transmitting lenses overlap light beams from each adjacent light transmitting lens, particularly a light beam from each light transmitting lens having a light transmitting lens on either side thereof, thereby to provide a continuous, uniform, reinforced light beam along said second array.

* * * * *